Oct. 14, 1952     J. N. DAVIS     2,613,548
RADIO CONTROL DEVICE
Filed Feb. 10, 1949
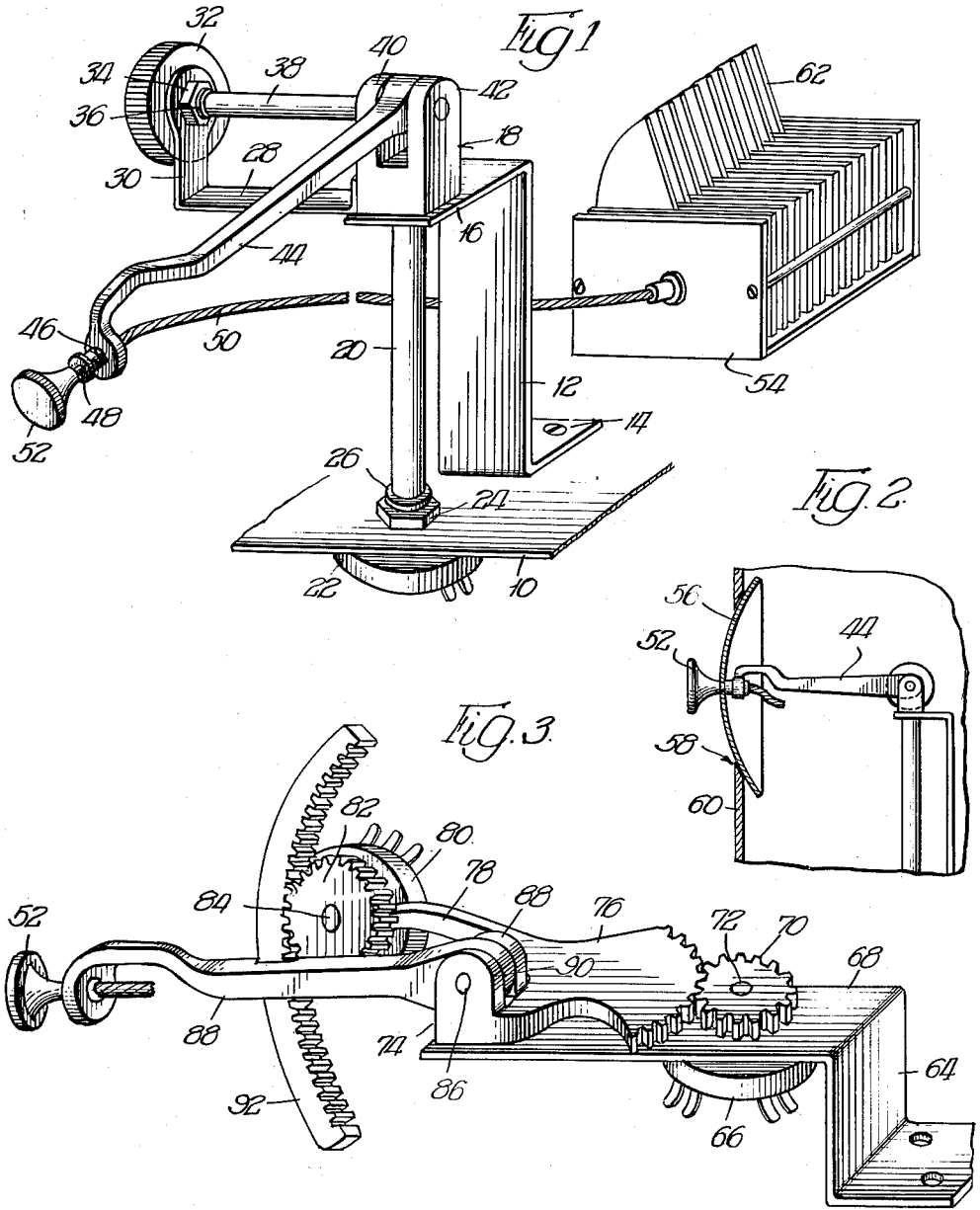
INVENTOR.
James N. Davis,
BY
Wilkinson, Huxley, Byron, + Hume
Attys.

Patented Oct. 14, 1952

2,613,548

UNITED STATES PATENT OFFICE 2,613,548

RADIO CONTROL DEVICE

James N. Davis, Crystal Lake, Ill.

Application February 10, 1949, Serial No. 75,546

5 Claims. (Cl. 74—471)

This invention relates to a control apparatus for radio, television, or other similar electronic equipment. More specifically, it relates to a unitary control member for operating a plurality of control devices such as the on-off switch, amplification control, tone control and tuning apparatus for equipment of this type.

The desirability of consolidating the controls on electronic devices of the class described has been particularly emphasized in recent times by the advent of television as an entertainment medium within reach of the general public. The complexity of the controls on the conventional television set is an undesirable feature thereof. Applicant is aware of the fact that others have developed so-called single knob controls for operating more than one control device, but these past constructions have been comparatively complicated in both construction and operation, and have apparently not met with a very extensive public acceptance or use.

It is believed that a control member incorporating the invention which is the subject of this present application overcomes the disadvantages inherent in these previous devices due to their complexity. In a home radio, the "unitary multiple control" (which is the terminology which will be used herein to identify applicant's device) has very desirable simplicity in that it reduces the number of control knobs necessary to perform numerous radio adjustments from the usual 3 or 4 to a single control knob. Moving the unitary multiple control member which embodies the present invention horizontally from the "off" position, which may be made the extreme left position, to substantially the center of the path of possible movement of the control member is an elementary and apparently natural movement, and the apparatus with which the control member is associated, such as a radio, may be designed so that such a movement as described turns the equipment on and also increases the volume to a normal level. Rotation of the unitary multiple control member to select the program desired and moving the control member vertically to adjust for tone is an equally elementary adjustment. Movement from one control member to another and back again, possibly a number of times, in order to attain the various adjustments desired in selecting a particular program is entirely eliminated. Such a reduction in the amount of movement may be even more significant in other applications than in connection with a home radio. For example it would be particularly useful in connection with an auto radio or any similar electronic equipment which is designed to be operated by an individual whose primary attention is directed toward other activities.

It is therefore an object of this invention to provide a simplified system of control for electronic devices and the like whereby adjustments can be made to a plurality of control devices through the selective movement of a single control member.

It is a further object of this invention to provide a mechanism of relatively simple construction which will permit the use of a unitary multiple control member to vary the adjustment of a plurality of control devices, such control member being adapted for both pivotal and rotary movement.

Still another object of this invention is to provide a mechanism of the character described which can utilize either a direct drive to the aforementioned control devices or which may include a geared drive which is associated with at least a part of such devices.

Another object of this invention is to provide a mechanism of the character described of a sturdy and simple design which may be easily maintained in operating condition since it is well adapted to withstand the rigors of hard usage and does not easily get out of adjustment or alignment.

Further objects and advantages of this invention will become evident as the description proceeds and from an examination of the accompanying drawing which illustrates one embodiment of the invention and in which similar numerals refer to similar parts throughout the several views.

In the drawings:

Figure 1 is a perspective view of one form of a unitary multiple control member embodying this invention, the device being shown in operative association with a plurality of control devices;

Figure 2 is a view in side elevation partly in vertical cross section of the unitary multiple control member shown in Figure 1, the member being shown in operative association with the front panel of an electronic device in which the control member is incorporated;

Figure 3 is a perspective view of an alternative form of a unitary multiple control member embodying this invention adapted to provide a high degree of precision of control.

Referring now to Figures 1 and 2, the panel 10, which may be the base of the chassis in the electronic device which incorporates the unitary multiple control member, as a part thereof, has the mounting bracket 12 mounted at one end thereon by a suitable fastening means such as the bolt 14. The bracket 12 is provided with an upper arm 16 extending at right angles thereto and having the U-shaped mounting block 18 rotatably mounted thereon. The shaft 20 is secured to the base of the mounting block 18, and extends downwardly therefrom through the arm 16 of the bracket 12. The shaft 20 is also cooperatively associated with the potentiometer 22 which may be mounted on the panel 10 by the nut 24 which is, in turn, adapted to be threaded on the bushing 26. Rotation of the mounting block 18 in a horizontal plane will therefore cause a rotation of the shaft 20 which, in turn, may be cooperatively associated with the potentiometer 22 so that the rotary movement of the shaft effects a change in the setting of the potentiometer.

A second bracket 28 may be mounted on one side of the mounting block 18 so as to extend outwardly therefrom. This bracket may also have an arm 30 extending at right angles to the body of the bracket upon which a second potentiometer 32 may be mounted with the aid of the nut 34, which is adapted to be threaded on the collar 36. The shaft 38 may be journaled in the upper ends of the two arms 40 and 42 of the mounting block 18 in such a way as to be also cooperatively associated with the potentiometer 32 in a manner similar to the association of shaft 20 and the potentiometer 22 as described above.

The portion of the shaft 38 which is disposed between the two arms 40 and 42 of the mounting block 18 may have secured thereto one end of a control arm 44, which arm is therefore free to pivot in a vertical plane. The opposite extremity of the arm 44 may have secured thereto a collar 46 having a flexible shaft 48 journaled therein. It is preferable that this end of the arm 44 have a configuration which permits the collar 46 to be mounted on an axis which is substantially the same as the longitudinal axis of the arm 44. The flexible shaft 48 may be contained in a flexible sheath 50 which is secured at one end to the collar 46. The control knob 52 may be secured to the end of the shaft 48 which projects from the collar 46, as best shown in Figure 1. The opposite end of the shaft 48 may be operatively associated with the shaft of a control device such as the variable condenser 54 shown in Figure 1. Rotation of the knob 52 about an axis coincident with the shaft 48 in the arrangement shown in Figure 1 will therefore cause the rotor shaft of the variable condenser 54 associated with the opposite end of the shaft 48 to also rotate and the desired setting of the condenser can thus be obtained by rotation of the knob 52.

A second collar 56 which is formed as a section of a sphere may also be secured to the collar 46 so that it is adapted to move within the circular opening 58 formed in the panel 60 of the electronic equipment in which the control mechanism is mounted, as best shown in Figure 2. It is obvious that if the radius of the sphere of which the collar 56 is a section is properly chosen, pivotal movement of the arm 44 in a vertical or horizontal plane will cause the collar 56 to move in such a way within the opening 58 in the panel 60 that said opening is at all times fully closed thereby. The knob 52 may also therefore be moved to any position within the circular confines of the opening 58, as desired, to control the adjustment of various control devices associated therewith.

If, for example, as mentioned above the potentiometer 22 is utilized to control the volume of a radio and has operably associated therewith an on-off switch (not shown) in the conventional fashion, the off position of the radio may be made the position of the knob 52 that is farthest to the left on the horizontal axis of the opening 58. In order to turn on the radio, the knob 52 is moved from this extreme left position toward the center of the opening 58, and the potentiometer 22 may be so designed and adjusted as to give a normal volume setting for most local reception at a position which is attained by moving the knob 52 to approximately the mid-position of the opening 58. At the same time the potentiometer 32 may be utilized to control the tone of the radio, and the adjustment of the tone will therefore be controlled by moving the knob 52 either up or down in a vertical plane. The selection of the station desired can be made at any position of adjustment of the arm 44 and the knob 52 by rotating the latter which in turn will rotate the rotor 62 of the variable condenser 54.

An embodiment of this invention which is adapted to permit finer adjustments than those which may be obtained by employing the form of device just described is shown in Figure 3. In this embodiment the bracket 64 may be mounted on the chassis in a manner similar to the mounting of bracket 12 in the form of device just described. The potentiometer 66 may be mounted on the upper arm 68 of the bracket 64 and may have a gear 70 secured to the shaft 72 thereof. A mounting block 74 having a substantially U-shaped central portion similar to the mounting block 18 described above, may also be mounted on the arm 68 of the bracket 64 so as to rotate in a plane parallel to the arm 68.

Formed integrally with the mounting block 74 and extending therefrom is the rack 76 adapted to mesh with the gear 70 carried by the shaft 72. The rack 76 also has the arm 78 formed integrally therewith which arm extends in the opposite direction from the mounting block 74 as the rack 76 and may have mounted thereon the potentiometer 80. The gear 82 is secured to the shaft 84 of the potentiometer 80 so that rotation of the gear 82 will vary the adjustment of the potentiometer.

A shaft 86 may be journaled in and extend between the two arms 88 and 90 of the mounting block 74, which arms are substantially normal to the arm 68 of the bracket 64 and the rack 76. The control arm 88 may be similar in form to the control arm 44 previously described in connection with the first embodiment of this invention and may be secured to the shaft 86 so that it is free to pivot in a plane substantially vertical to the arm 68 of the bracket 64. The arcuate rack 92 may be formed integrally with the arm 88 at a substantially central point on the arm and be so disposed as to extend laterally therefrom so that it is adapted to mesh with the gear 82. This arrangement provides for the rotation of the gear 82 by the arcuate rack 92 whenever the arm 88 is pivoted in a vertical plane. At the same time the mounting bracket 74 and the various components associated therewith are all free to rotate in a horizontal plane, which rotation of the mounting block 74, in turn, causes the rack 76 to pivot, thus causing the rotation of the gear 70 and the shaft 72 of the potentiometer 66 associated therewith.

It may thus be seen that here again vertical movement of the arm 88 provides an adjustment of the potentiometer 80, while horizontal movement of that arm provides an adjustment of the potentiometer 66. The outer extremity of the arm 88 may be formed in the same fashion as that end of the corresponding arm 44 so that the knob 52, the flexible shaft 48, the collar 46 and the shaft 50 may be carried thereby in substantially the same fashion. Obviously the equipment with which this latter embodiment may be associated can be designed so that movements of the knob 52 will produce substantially the same results as described above for the embodiment shown in Figures 1 and 2.

The unitary multiple control member described above is particularly adapted for use in an auto radio, since the driver of the auto will then not find it necessary to move his hand from the station selecting control, to the volume control and thence to the tone control, if necessary. For example, when a weak station is being selected, it is only necessary for the driver to move the control knob to the right to increase the volume and either up or down for proper tonal adjustment. In conventional car radios, it is now necessary to release the station selector, increase the volume and then return to the station selector.

A further possible use of the unitary multiple control device is in aircraft. The advantages would be substantially the same as those just described above in regard to an auto radio and the simplicity of control and speed of tuning would undoubtedly be of even greater advantage.

It is also now well known that conventional television sets have an unusually large number of control knobs associated therewith and it is believed that the present invention is well adapted for use in this field. Several of the properly related adjustment elements in a television set could be adapted to be operated by one unitary multiple control knob. For example, the focus, intensity, contrast and off-on controls for the screen of a conventional television set have such a relationship. Likewise the volume, tone, channel, selection and audio off-on controls for the remaining portion of the set could be similarly adapted to a second unitary multiple control member. It may thus be readily seen that there are numerous possible applications for a control member of this general character, if the device is simple enough in design and construction to be capable of practical use.

The drawing and the above discussion are not intended to represent the only possible form of this invention, in regard to details of construction. Changes in form and in the proportion of parts, as well as the substitution of equivalents are contemplated, as circumstances may suggest or render expedient, without departing from the spirit or scope of this invention as further defined in the following claims.

What is claimed is:

1. A control apparatus for a radio receiver or the like, having a plurality of control devices, comprising a fixed support member, a base member rotatably mounted thereon, a shaft journalled in said base member so as to be rotatable in a plane substantially parallel to the plane of rotation of said base member, a control arm for rotating said shaft, said control arm being movable in a plane substantially normal to the plane of rotation of said rotatable base member, a control shaft secured to the pivoted end of said control arm so as to be rotated by pivotal movement of the latter, an electronic control device fixed to said rotatable base member operatively connected to said control shaft, a second control shaft secured to said rotatable base member and adapted to be rotated by movement thereof, a second electronic control device mounted in fixed relation to said support member, said second control shaft being operatively connected thereto, a control member rotatably mounted on the free end of said control arm, and a flexible shaft secured thereto adapted to transmit rotary motion of said control member to a third electronic control device.

2. A control apparatus for a radio receiver or the like, having a plurality of control devices, comprising a fixed support member, a base member rotatably mounted thereon, a control arm pivotally mounted in said rotatable base member for movement in a plane substantially normal to the plane of rotation of said rotatable base member, a control device mounted on said rotatable base member, a rotatable control shaft on said control device, a gear member mounted on said control shaft, an arcuate rack member carried by said control arm adapted to cooperate with said gear member, a second control device mounted in fixed relation to said support member, a second rotatable control shaft on said second control device, a second gear member mounted on said second control shaft, and a second rack member on said rotatable base member adapted to cooperate with said second gear member.

3. A control apparatus for a radio receiver or the like, having a plurality of control devices, comprising a fixed support member, a base member rotatably mounted thereon, a control arm pivotally mounted in said rotatable base member for movement in a plane substantially normal to the plane of rotation of said rotatable base member, a control device mounted on said rotatable base member, a rotatable control shaft on said control device, a gear member mounted on said control shaft, an arcuate rack member carried by said control arm adapted to cooperate with said gear member, a second control device mounted in fixed relation to said support member, a second rotatable control shaft on said second control device, a second gear member mounted on said second control shaft, a second rack member on said rotatable base member adapted to cooperate with said second gear member, a control member rotatably mounted on the free end of said control arm, and a flexible shaft secured thereto adapted to transmit rotary motion of said control member to a third control device.

4. A control apparatus for a radio receiver or the like, having a plurality of control devices, comprising a fixed support member, a base member rotatably mounted thereon, a control arm pivotally mounted in said rotatable base member for movement in a plane substantially normal to the plane of rotation of said rotatable base member, a control device fixed to said rotatable base member, a rotatable control shaft on said control device, a gear member mounted on said control shaft, an arcuate rack member carried by said control arm adapted to cooperate with said gear member, a second control shaft secured to said rotatable base member and adapted to be rotated by movement thereof, and a second electronic device mounted in fixed relation to said support member, said second control shaft being operatively connected thereto.

5. A control apparatus for a radio receiver or the like, having a plurality of electronic control devices, comprising a fixed support member, a base member rotatably mounted thereon, a shaft journalled in said base member so as to be rotatable in a plane substantially parallel to the plane of rotation of said base member, a control arm for rotating said shaft said control arm being movable in a plane substantially normal to the plane of rotation of said rotatable base member, a control shaft secured to the pivoted end of said control arm so as to be rotated by pivotal movement of the latter, an electronic control device fixed to said rotatable base member and operatively connected to said control shaft, a second electronic control device mounted in fixed relation to said support member, a second rotatable control shaft on said second electronic control device, a gear member mounted on said control shaft and a rack on said rotatable base member adapted to cooperate with said gear member.

JAMES N. DAVIS.

REFERENCES CITED

The following references are of record in the file of this patent:

UNITED STATES PATENTS

| Number | Name | Date |
| --- | --- | --- |
| 539,863 | MacHaffie | May 28, 1895 |
| 2,004,918 | Mitchell | June 11, 1935 |
| 2,026,220 | Denker | Dec. 31, 1935 |
| 2,082,410 | McCauley | June 1, 1937 |
| 2,122,306 | Volz | June 28, 1938 |
| 2,149,754 | Whiteford | Mar. 7, 1939 |
| 2,396,309 | Wodal | Mar. 12, 1946 |
| 2,480,521 | Thompson | Aug. 30, 1949 |